(12) United States Patent
Schenk

(10) Patent No.: US 9,718,134 B2
(45) Date of Patent: Aug. 1, 2017

(54) DRILL CHUCK

(71) Applicant: Roehm GmbH, Sontheim/Brenz (DE)

(72) Inventor: Peter Schenk, Niederstotzingen (DE)

(73) Assignee: Roehm GmbH, Sontheim/Brenz (DE)

( * ) Notice: Subject to any disclaimer, the term of this patent is extended or adjusted under 35 U.S.C. 154(b) by 217 days.

(21) Appl. No.: 14/604,342

(22) Filed: Jan. 23, 2015

(65) Prior Publication Data

US 2015/0130144 A1    May 14, 2015

Related U.S. Application Data

(63) Continuation of application No. PCT/DE2013/100272, filed on Jul. 22, 2013.

(30) Foreign Application Priority Data

Jul. 23, 2012  (DE) .................... 20 2012 102 742 U
Dec. 13, 2012  (DE) ........................ 10 2012 112 209

(51) Int. Cl.
*B23B 31/12*    (2006.01)

(52) U.S. Cl.
CPC ...... *B23B 31/1238* (2013.01); *B23B 2226/61* (2013.01); *B23B 2231/44* (2013.01); *Y10T 279/17632* (2015.01)

(58) Field of Classification Search
CPC ............. B23B 31/1238; B23B 2231/44; Y10T 279/17632
See application file for complete search history.

(56) References Cited

U.S. PATENT DOCUMENTS

| 5,125,673 A | * | 6/1992 | Huff | B23B 31/1207 |
| | | | | 279/60 |
| 5,501,473 A | * | 3/1996 | Barton | B23B 31/1238 |
| | | | | 279/62 |
| 5,540,124 A | | 7/1996 | Srhoj | |
| 5,765,839 A | * | 6/1998 | Rohm | B23B 31/1215 |
| | | | | 279/140 |
| 5,816,582 A | * | 10/1998 | Steadings | B23B 31/123 |
| | | | | 279/140 |
| 5,984,320 A | * | 11/1999 | Nakamura | B23B 31/1238 |
| | | | | 279/140 |

(Continued)

FOREIGN PATENT DOCUMENTS

| CA | 2 028 001 | 7/1996 |
| CN | 1051003 A | 5/1991 |

(Continued)

OTHER PUBLICATIONS

Chinese Office Action for Chinese Application No. 201380022567.2 dated Dec. 3, 2015 with English translation.

(Continued)

*Primary Examiner* — Eric A Gates
(74) *Attorney, Agent, or Firm* — Muncy, Geissler, Olds & Lowe, P.C.

(57) ABSTRACT

A drill chuck having a chuck body, which is produced from plastic, in particular from fiber-reinforced plastic, and has a spindle holder and a tool holder and in which clamping jaws that can be adjusted by a threaded ring are guided. The chuck body has a securing ring on an outer circumference in a region of the tool holder.

15 Claims, 8 Drawing Sheets

(56) References Cited

U.S. PATENT DOCUMENTS

| | | | | |
|---|---|---|---|---|
| 5,988,653 | A * | 11/1999 | Kuo | B23B 31/123 279/140 |
| 6,045,141 | A * | 4/2000 | Miles | B23B 31/1238 279/60 |
| 6,073,939 | A * | 6/2000 | Steadings | B23B 31/123 279/140 |
| 6,095,530 | A * | 8/2000 | Rohm | B23B 31/1238 279/158 |
| 6,129,363 | A * | 10/2000 | Mack | B23B 31/1215 279/158 |
| 6,257,596 | B1 * | 7/2001 | Yang | B23B 31/123 279/140 |
| 6,428,018 | B1 * | 8/2002 | Aultman | B23B 31/1215 279/140 |
| 6,550,785 | B2 * | 4/2003 | Rohm | B23B 31/123 279/140 |
| 6,637,756 | B2 | 10/2003 | McCurry | |
| 6,688,610 | B2 * | 2/2004 | Huggins | B23B 31/1071 279/137 |
| 7,497,444 | B2 | 3/2009 | Sakamaki et al. | |
| 7,832,965 | B2 * | 11/2010 | Mack | B23B 31/001 279/157 |
| 9,387,540 | B2 * | 7/2016 | Schenk | B23B 31/1238 |
| 2002/0192043 | A1 * | 12/2002 | Lin | B23B 31/1238 408/124 |
| 2003/0141676 | A1 | 7/2003 | Sakamaki et al. | |
| 2015/0115550 | A1 * | 4/2015 | Schenk | B23B 31/123 279/60 |

FOREIGN PATENT DOCUMENTS

| | | |
|---|---|---|
| CN | 1084444 A | 3/1994 |
| CN | 1446657 A | 10/2003 |
| CN | 1693019 A | 11/2005 |
| CN | 201030443 Y | 3/2008 |
| CN | 201815693 U | 5/2011 |
| CN | 201889466 U | 7/2011 |
| DE | 198 00 998 A1 | 7/1999 |
| DE | 198 29 931 A1 | 7/1999 |
| EP | 0 933 155 A2 | 8/1999 |
| JP | H 11-42518 A | 2/1999 |
| JP | H 11-165204 A | 6/1999 |

OTHER PUBLICATIONS

Japanese Office Action for Japanese Application No. 2015-523420 dated Jan. 20, 2017 with English translation.
Chinese Office Action for Chinese Application No. 201380022567.2 dated Dec. 3, 2016 (typo on English translation) with English translation.

* cited by examiner

DRILL CHUCK

This nonprovisional application is a continuation of International Application No. PCT/DE2013/100272, which was filed on Jul. 22, 2013, and which claims priority to German Patent Application No. 20 2012 102 742.9, which was filed in Germany on Jul. 23, 2012 and German Patent Application No. 10 2012 112 209.1, which was filed in Germany on Dec. 13, 2012, and which are all herein incorporated by reference.

BACKGROUND OF THE INVENTION

Field of the Invention

The present invention relates to a drill chuck with a chuck body, which is made of plastic, for example, fiber-reinforced plastic, and has a spindle socket and a tool holder and in which are guided clamping jaws that can be adjusted via a threaded ring.

Description of the Background Art

Drill chucks are known, for example, from DE 198 29 931 A1. In order to counteract the stresses that occur during operation, the chuck body made of plastic is reinforced by means of metal parts that are cast into the plastic during the manufacturing process. This results in a very complex manufacturing process, which for this reason also has a negative impact on the manufacturing costs.

In the drill chucks known from DE 198 00 998 C2, which corresponds to U.S. Pat. No. 6,095,530, which is incorporated herein by reference, metallic reinforcing elements are cast into the chuck body made of plastic.

If, however, the use of these cast-in reinforcing materials is entirely omitted, then there is the problem that chuck bodies made exclusively of plastic must have a large diameter at the chief stress points in order to withstand the forces that are generated during drilling operation. This makes it impossible to produce drill chucks that are as compact as those made of metal.

SUMMARY OF THE INVENTION

It is therefore an object of the present invention to reduce the above-mentioned disadvantages and create a drill chuck that requires only a small amount of assembly work.

This object is attained in an embodiment according to the invention in a drill chuck that is provided with a securing bushing on its outer circumference in the region of the tool holder. Using a securing bushing of this kind makes it possible to locally reinforce the chuck body in the region in which metallic chuck bodies have only a slight wall thickness, a feature that can now be maintained in chuck bodies made of plastic. As a result, it is now possible to also implement relatively small chuck body diameters in the region of the head of the chuck body without having a negative impact on the stability of the drill chuck according to the invention. The provision of the securing bushing on the outer circumference also ensures a simple assembly since it is no longer necessary to insert a reinforcing element during the production process, in particular while the chuck body is being injection molded.

It has therefore turned out to be particularly advantageous if the chuck body made of plastic is embodied without metallic reinforcing inserts. The complete elimination of metallic reinforcing inserts makes it possible to implement a simple manufacturing process, since the entire chuck body can be produced in the form of an injection-molded component. This has a positive impact on the manufacturing costs of the drill chuck according to the invention.

In an embodiment, the securing bushing can be combined with metallic reinforcing elements that are cast into or associated with the chuck body, which is particularly advantageous in the vicinity of the spindle socket.

For operational reliability of the drill chuck according to the invention, it has also turned out to be advantageous if the securing bushing is connected to the chuck body in an axially immobile fashion. This makes it possible in particular to ensure that the securing bushing can also serve to axially support other components associated with the drill chuck.

The securing bushing can be provided with a denticulation, in particular a fine denticulation, on its inner circumference. The fine denticulation makes it possible in particular to compensate for manufacturing tolerances of the chuck body since as the securing bushing is being mounted onto the chuck body, a redistribution of the material in the chuck body takes place, which improves the true-running characteristics of the drill chuck according to the invention so that there is no longer a limitation in practical suitability in comparison to metallic chuck bodies.

The height of the denticulation can be in a range from 0.15 mm to 0.60 mm and particularly preferably, is 0.25 mm. The choice of the height of the denticulation particularly ensures that the redistribution of material is optimized. In this connection, it has also turned out to be advantageous if the angle between the adjacent tooth flanks preferably lies in an angular range from 45° to 75°, and particularly preferably, is 60°, which is likewise beneficial to the redistribution of material.

The tooth valleys can be rounded and the radius of the rounded tooth valleys can be in a range from 0.10 mm to 0.25 mm and particularly preferably, is 0.16 mm. This makes it possible to ensure a simplified manufacturing process.

In order to optimize the redistribution of material, the number of teeth of the denticulation can be in a range from 80 to 200, preferably in a range from 100 to 140, and particularly preferably, be 120 teeth. If the number of teeth is too large, then this inhibits the redistribution of material, but if the number of teeth is too low, then only an incomplete distribution of the chuck body material occurs, thus not improving the true-running characteristics enough.

The securing bushing can be provided with a collar that points radially outward in order to axially support a clamping sleeve that adjusts the threaded ring. The design of the collar provides an axial securing of the clamping sleeve. In this connection, it has also turned out to be advantageous if the collar is flanged. The flanging makes it possible to simply manufacture the collar in one piece with the securing bushing, which has a positive impact on the manufacturing costs.

The securing bushing, at its end oriented away from the spindle socket, can have a stop surface pointing radially inward for covering the chuck body in the region of the tool holder. Such a stop surface ensures that in the event of an inadvertent piercing of a wall during drilling, the stop surface of the drill chuck will come into contact with the wall, thus preventing this from damaging the plastic chuck body.

A support sleeve can be provided in order to support the side of the threaded ring oriented toward the tool holder and if the securing bushing secures the axial position of the support sleeve on the chuck body. Such a design ensures that the transmission chain for axially securing the threaded ring only acts on the plastic chuck body to a very limited degree. This has a positive impact on the longevity of the drill chuck according to the invention.

The support sleeve can be embodied as conical and can have a cylindrical section at the end oriented toward the tool holder. The design of the support sleeve, which can be composed of metal, makes it possible to support it against the chuck body. The cylindrical section also facilitates assembly since during installation of the support sleeve from the end oriented toward the tool holder, the chuck body limits the axial displacement of the support sleeve.

The securing bushing can be made of, for example, metal, in particular steel, stainless steel, or aluminum. Embodying the securing bushing out of metal particularly improves the reinforcing of the chuck body at the chief stress points. Furthermore, such a material selection makes it easy to manufacture the securing bushing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
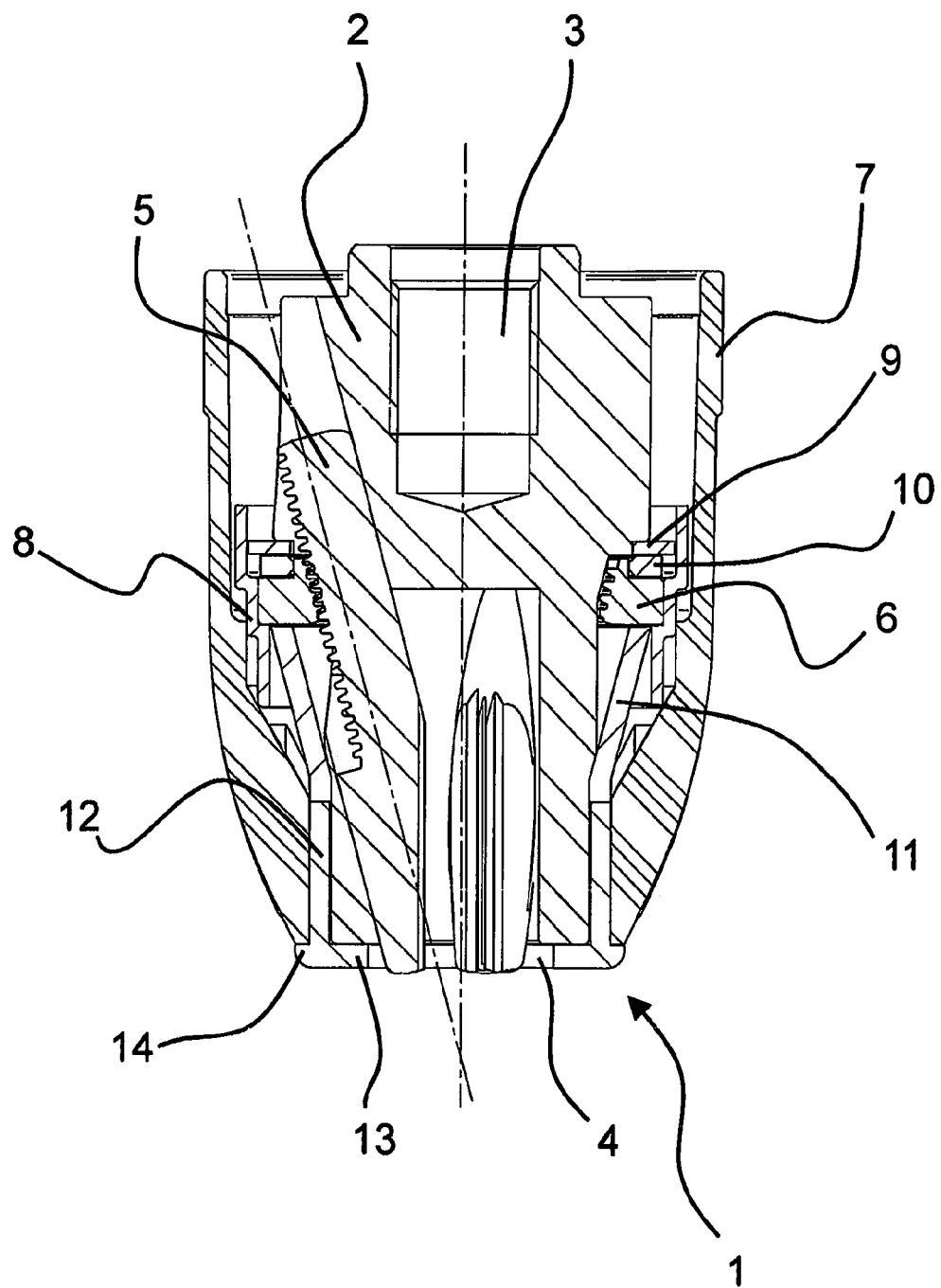
FIG. 1 is a sectional view of an exemplary embodiment of a drill chuck according to the invention.

FIG. 1 shows a sectional view of a first embodiment of a drill chuck 1 according to the invention, with a chuck body 2 that is made of fiber-reinforced plastic. The chuck body 2 has a spindle socket 3 for receiving a drill spindle of a drill and at the opposite end, a tool holder 4. Clamping jaws 5 are guided in the chuck body 2 and can be adjusted in guide recesses in a known way at an angle relative to the chuck axis by means of a threaded ring 6. In order to move the threaded ring 6, a clamping sleeve 7 is provided, which in the exemplary embodiment shown, acts on the threaded ring 6 via an intermediate sleeve 8, but can also rest directly against it. Axially toward the rear in the direction of the spindle socket 3, the threaded ring 6 in this case is supported against the chuck body 2 via a thrust ring 9 and by means of a ball bearing 10. The threaded ring 6 is supported in the direction of the tool holder 4 by means of a support sleeve 11, which in turn is supported by means of a securing bushing 12, which surrounds the chuck body 2 on the outer circumference in the vicinity of the tool holder 4. The support sleeve 11 in this case is embodied as essentially conical. At its end oriented away from the spindle socket 3, the securing bushing 12 has a stop surface 13 pointing radially inward, which protects the chuck body 2 in the vicinity of the tool holder 4. The securing bushing 12 also has a collar 14, which serves to support the clamping sleeve 7. It is thus possible to manufacture the chuck body 2 in one production step without first having to laboriously incorporate metal reinforcing elements into the chuck body 2. In addition, the drill chuck 1 according to the invention functions well with a very small number of parts and also facilitates assembly due to its design. First, the threaded ring 6 is placed onto the chuck body 2. Then the support sleeve 11 is installed, followed by the clamping sleeve 7, whose end oriented toward the spindle socket 3 is supported against the chuck body 2. Then finally, the securing bushing 12 is joined to the chuck body 2, thus securing the axial position of the clamping sleeve 7 and the threaded ring 6.

Figure 2:
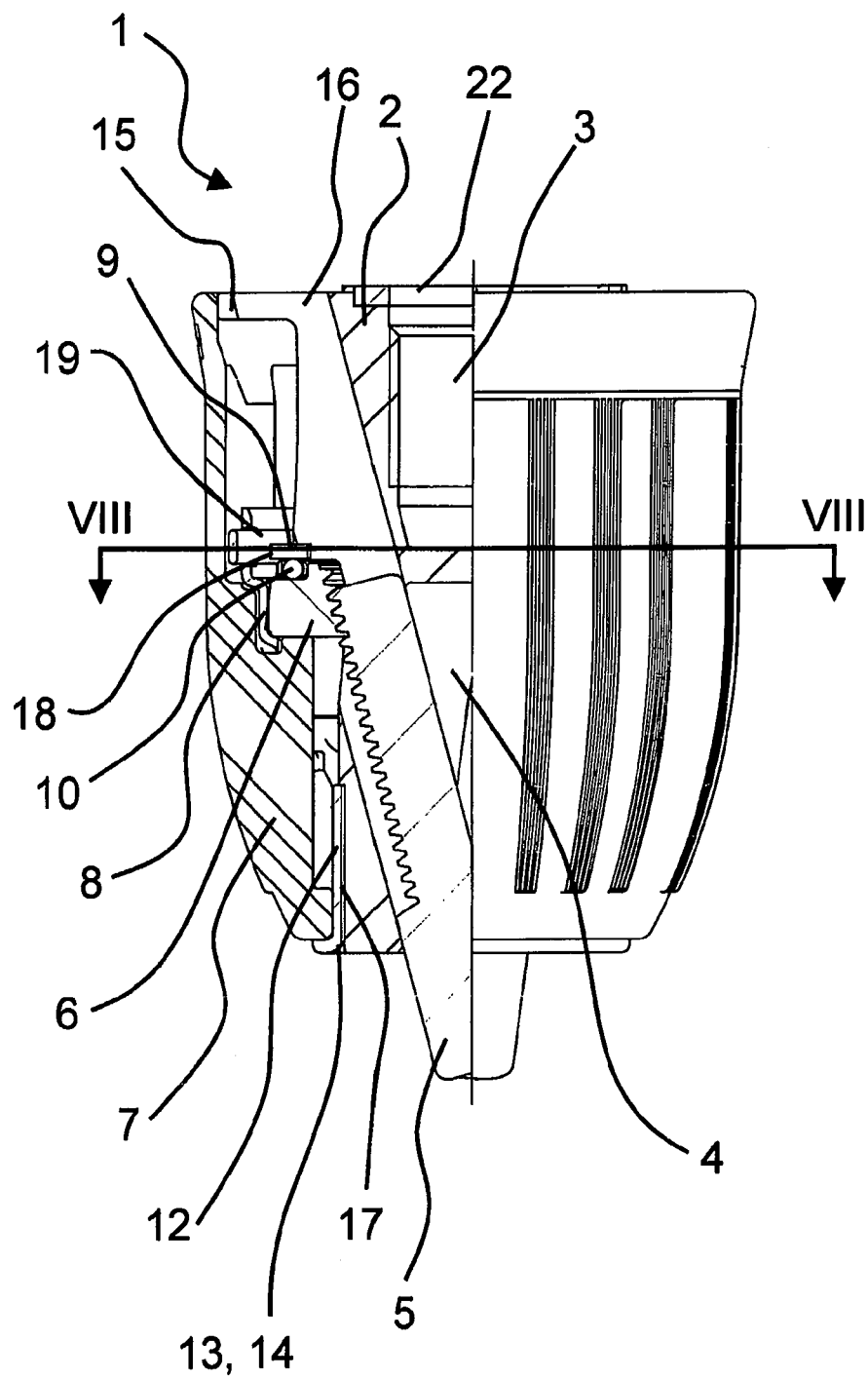
FIG. 2 is a partially sectional view of an exemplary embodiment of a drill chuck according to the invention.

FIG. 2 shows a partially sectional view of a second exemplary embodiment of a drill chuck 1 according to the invention. By contrast with the exemplary embodiment shown in FIG. 1, the radial support and guidance of the clamping sleeve 7 at the end of the chuck body 2 that accommodates the spindle socket 3 is provided by means of a support ring 15 that is embodied of one piece with the chuck body 2. The support ring 15 in this case has outlet openings 16 that are aligned with the clamping jaws 5 and facilitate the manufacturing process of the chuck body 2. For this purpose, during production of the chuck body 2, the outlet openings 16 are cast directly into it by means of corresponding molds. The axial support of the threaded ring in the direction of the end of the chuck body 2 oriented toward the tool holder 4 is provided in the second exemplary embodiment by means of the clamping sleeve 7, which is equipped with a support element 27 for this purpose. In the exemplary embodiment shown in FIG. 2, the collar 14 of the securing bushing 12 also constitutes the stop surface 13 that protects the chuck body 2 from damage in the vicinity of the tool holder 4.

Figure 3:
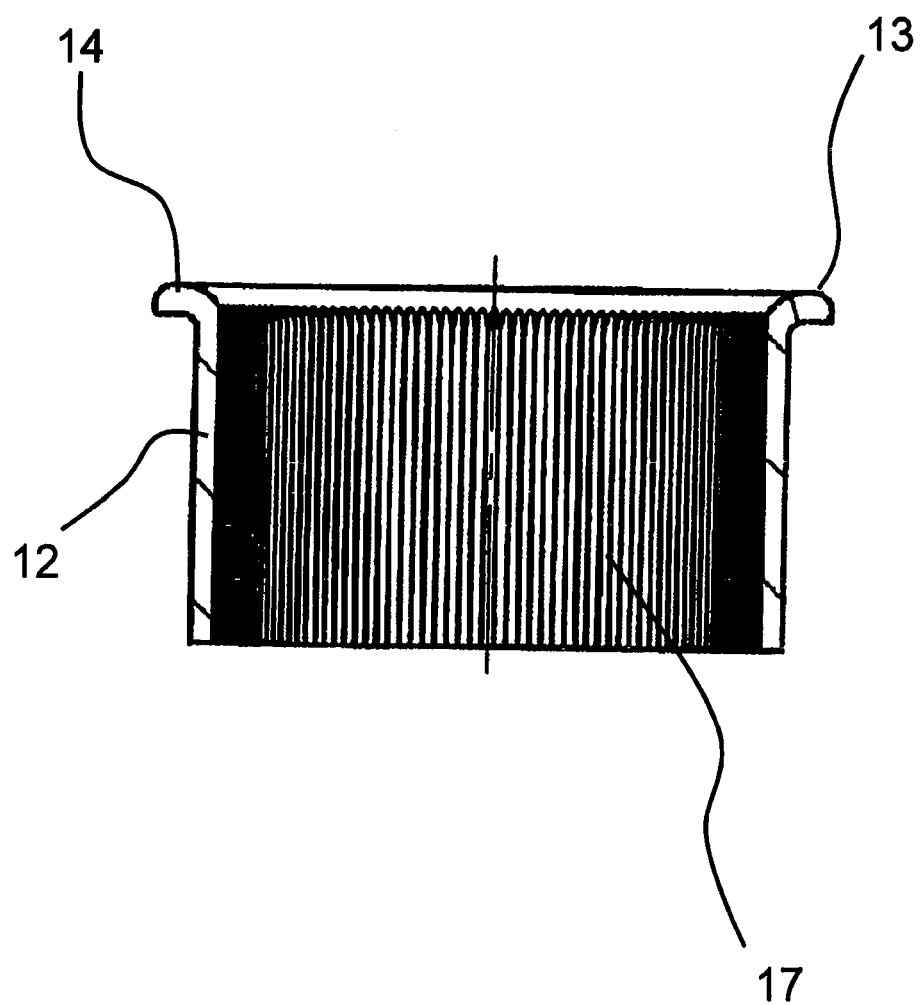
FIG. 3 is a sectional view of a securing bushing with a denticulation.
Figure 4:
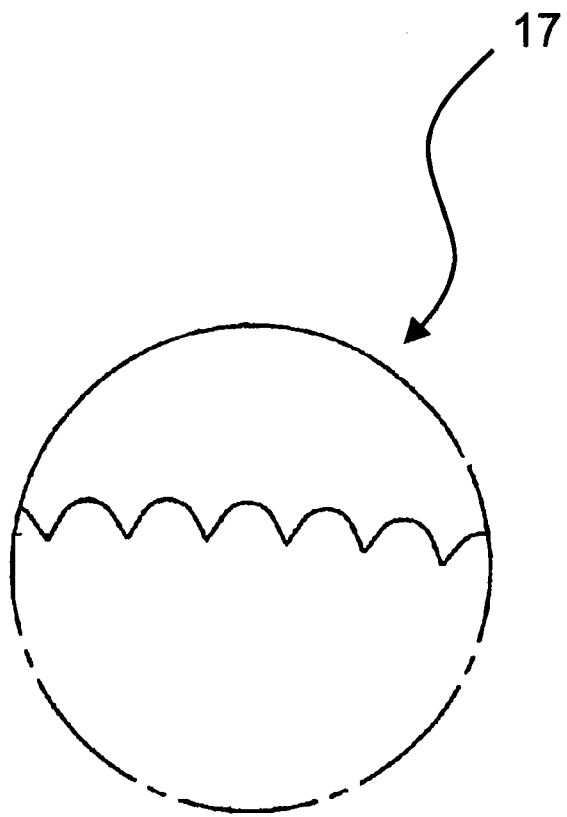
FIG. 4 is a detailed view of the denticulation of the securing bushing.

In order to improve the true-running characteristics of the chuck body 2 and to compensate for the production tolerances that arise due to the manufacturing process, the securing bushing 12 is provided with a denticulation 17 on the inner circumference. As a result, when the securing bushing 12 is pressed onto the chuck body 2, a plastic deformation of the chuck body 2 occurs. FIG. 3 shows a side view of the securing bushing 12 in which the denticulation 17 on the inner circumference side is visible. In the exemplary embodiment shown in FIG. 3, there are 120 teeth. As can be inferred from the detail view shown in FIG. 4, the denticulation 17 has rounded tooth valleys whose radius in the exemplary embodiment shown is 0.16 mm. The angle between the adjacent tooth flanks is 60° and the height of the denticulation 17 is 0.25 mm. The selection of these parameters makes it possible to positively influence the redistribution of the material in the chuck body 2.

Figure 5:
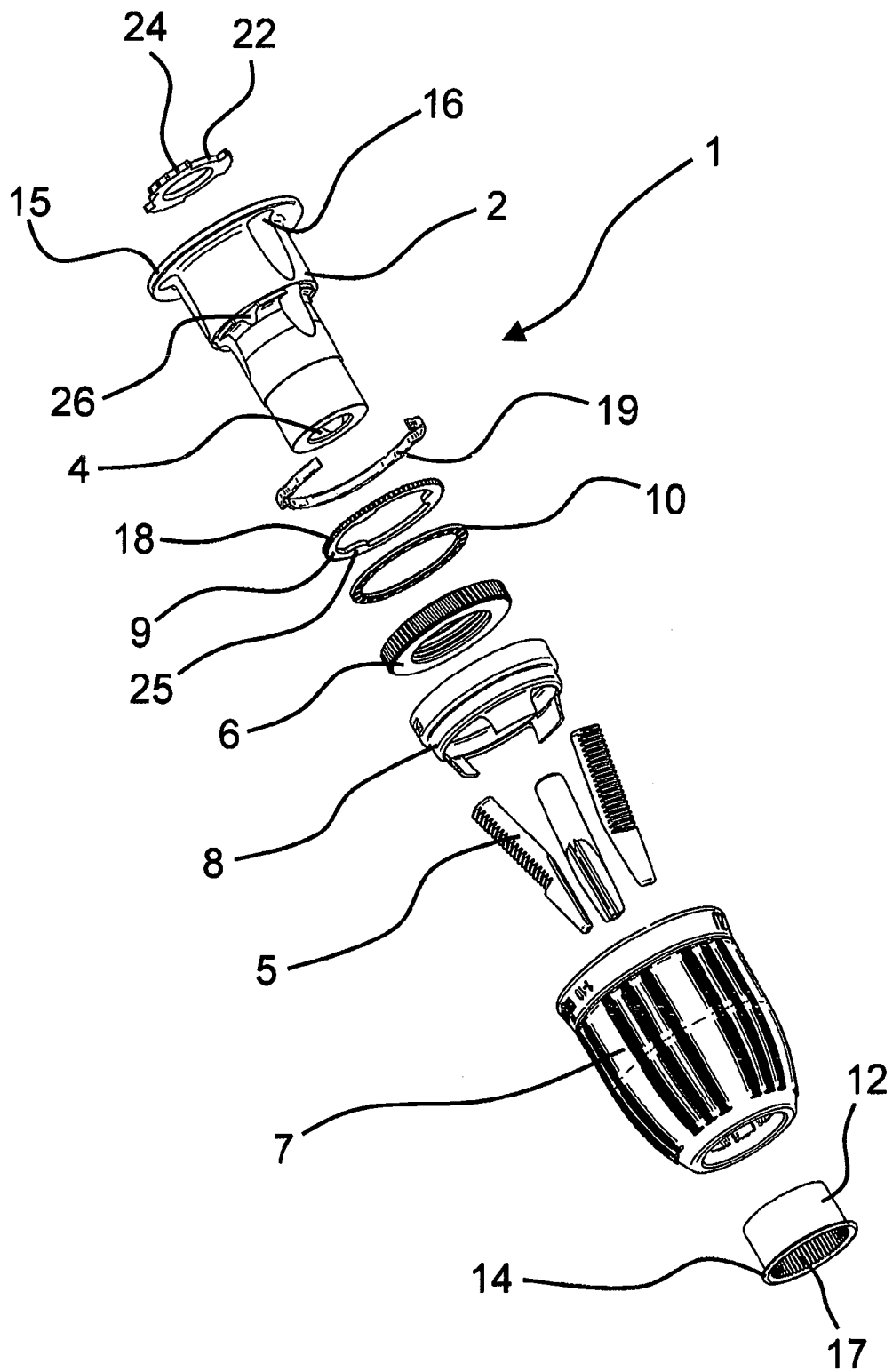
FIG. 5 is an exploded view of an exemplary embodiment.

FIG. 5 shows an exploded view of the second exemplary embodiment of the drill chuck 1. In particular, it also clearly shows that the thrust ring 9 has a locking denticulation 18 on its outer circumference in which a locking element 19 supported on the intermediate sleeve 8 can engage by means of a control cam embodied on the clamping sleeve 7 in order to thus prevent an inadvertent adjustment of the threaded ring 6 and thus of the clamping jaws 5. An end plate 22 that locally reinforces the chuck body 2 in the vicinity of the spindle socket 3 is also visible in FIG. 5. The metal end plate 22 here has radial collar elements 24 to produce a form-fitting engagement with the chuck body 2.

Figure 6:
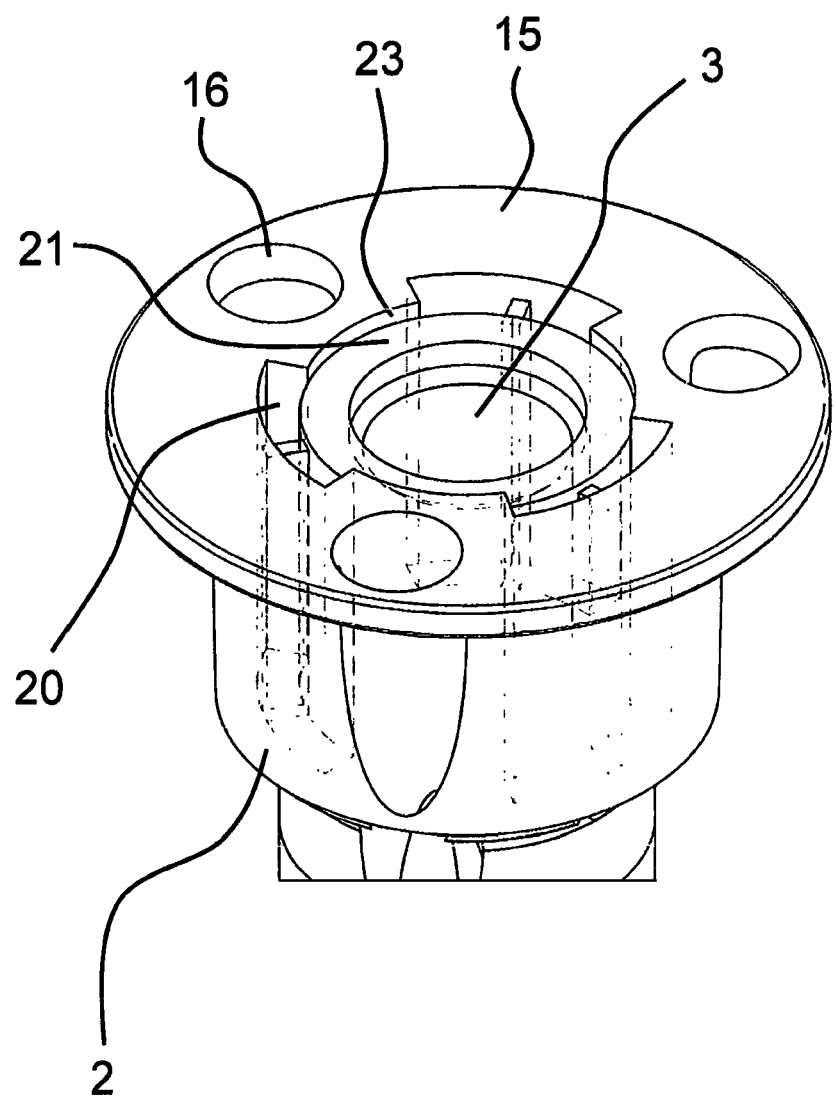
FIG. 6 is a perspective view of the chuck body.

FIG. 6 shows a perspective view of the chuck body 2 made of fiber-reinforced plastic. As is clear from the drawing, in the vicinity of the spindle socket 3, the chuck body 2 has a plurality of annular segment-like axial slots 20 that are incorporated into the chuck body 2 during the manufacturing process. The depth of the slots 20 here is essentially adapted to the axial span of the spindle socket 3, as a result of which the wall thickness of the chuck body 2 remains essentially constant over its axial span. During the hardening of the chuck body 2, this ensures the suppression of material strength-dependent effects that would have a negative impact on the stability and true-running characteristics of the chuck body 2. FIG. 6 also shows the support ring 15 that is embodied as one piece with the chuck body 2; this support ring serves to radially guide the clamping sleeve 7 and has outlet openings 16 that are aligned with the clamping jaws 5 and that permit a simple and therefore inexpensive production of the chuck body 2 in a single piece. Furthermore, the end of the chuck body 2 that accommodates the spindle socket 3 is provided with a seat 21 for accommodating the metal end plate 22. This seat 21 has an undercut 23 into which the end plate 22 can be clipped.

Figure 7:
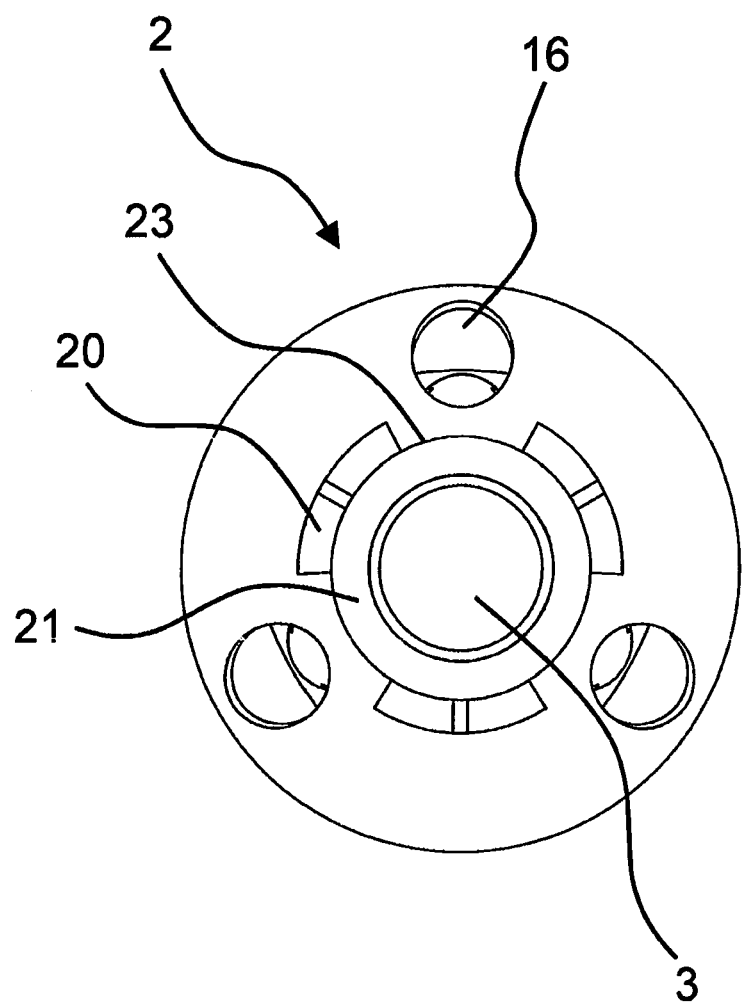
FIG. 7 is a top view of the back end of the chuck body.

FIG. 7 shows a top view of the back end of the chuck body 2. In particular, this drawing once again shows the support ring 15 and the outlet openings 16 embodied in the support ring 15, which are aligned with the clamping jaws 5. FIG. 7 also shows the annular segment-like axial slots 20 into which the seat 21 in the exemplary embodiment shown extends, so as to allow to form-fittingly insert the metallic end plate 22, which has radial collar elements 24 for this purpose.

Figure 8:
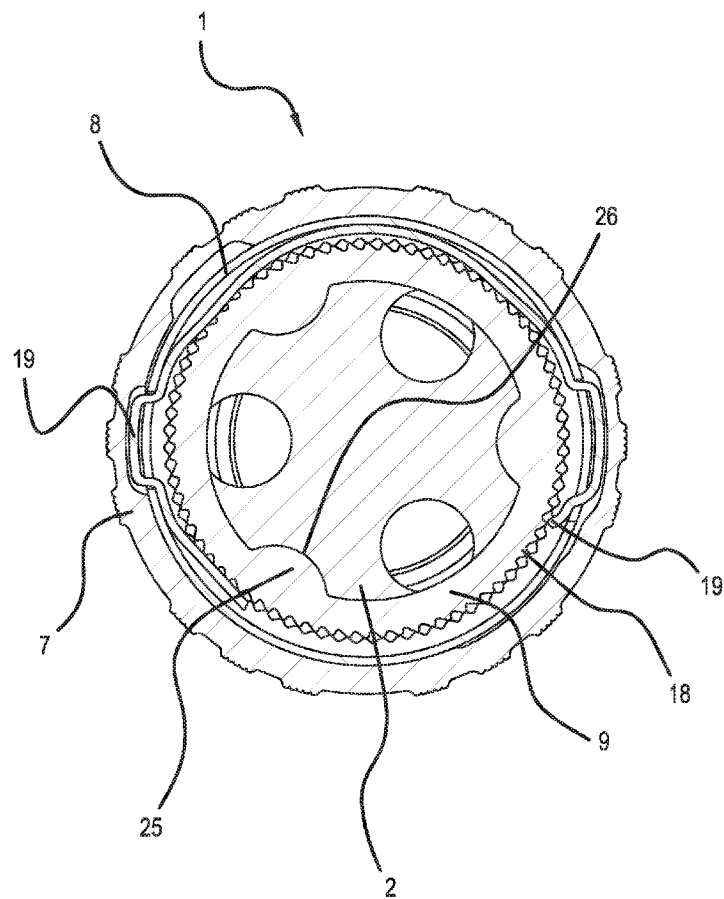
FIG. 8 is a sectional view along the line VIII-VIII from FIG. 2.

The sectional view shown in FIG. 8 depicts the thrust ring 9 that is connected to the chuck body 2 in a rotationally secured fashion; this thrust ring 9 is provided for axially supporting the threaded ring 6 against the chuck body 2 and is equipped with the locking denticulation 18. In order to connect the thrust ring 9 to the chuck body 2 in a rotationally secured fashion, the thrust ring 9 is equipped with cams 25, which can be inserted into corresponding recesses 26 that are embodied in the chuck body 2. By means of the locking denticulation 18, it is possible to prevent a relative movement between the threaded ring 6 and the chuck body 2, which could possibly result in an undesired adjustment of the clamping jaws numeral 5. For this purpose, the intermediate sleeve 8 that is connected to the threaded ring 6 in a rotationally secured fashion is provided with the locking element, which extends through the intermediate sleeve 8 and which, by means of the control cam embodied on the clamping sleeve 7, can be engaged with and disengaged from the locking denticulation 18 embodied on the thrust ring 9.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A drill chuck comprising:
   a chuck body that is made of plastic or fiber-reinforced plastic;
   a spindle socket; and
   a tool holder in which clamping jaws that are adjustable via a threaded ring are guided in adjustable fashion;
   a securing bushing arranged on an outer circumference of the chuck body in a vicinity of the tool holder,
   wherein the securing bushing has a fine denticulation on an inner circumference of the securing bushing,
   wherein a height of the denticulation lies in a range from 0.15 mm to 0.60 millimeters,
   wherein an angle between adjacent tooth flanks lies in an angular range from 45° to 75°,
   wherein tooth valleys are rounded and a radius of the rounded tooth valleys lies in a range from 0.10 mm to 0.25 mm,
   wherein a number of teeth of the denticulation lies in a range from 80 to 200, and
   wherein when the securing bushing is mounted onto the chuck body, material in the chuck body is redistributed.

2. The drill chuck according to claim 1, wherein the chuck body made of plastic or fiber-reinforced plastic does not have metallic reinforcing inserts.

3. The drill chuck according to claim 1, wherein the securing bushing is cast into the chuck body.

4. The drill chuck according to claim 1, wherein the securing bushing is connectable to the chuck body in an axially immobile fashion.

5. The drill chuck according to claim 1, wherein a height of the denticulation is 0.25 mm.

6. The drill chuck according to claim 1, wherein an angle between the adjacent tooth flanks is 60°.

7. The drill chuck according to claim 1, wherein the tooth valleys are rounded and a radius of the rounded tooth valleys is 0.16 mm.

8. The drill chuck according to claim 1, wherein a number of teeth of the denticulation is 120 teeth.

9. The drill chuck according to claim 1, wherein the securing bushing is provided with a collar that points radially outward and axially supports a clamping sleeve that adjusts the threaded ring.

10. The drill chuck according to claim 9, wherein the collar is flanged.

11. The drill chuck according to claim 1, wherein the securing bushing at an end oriented away from the spindle socket, has a stop surface pointing radially inward for covering the chuck body in a region of the tool holder.

12. The drill chuck according to claim 1, wherein a support sleeve is provided in order to support a side of the threaded ring oriented toward the tool holder and an axial position of the support sleeve in the chuck body is secured by the securing bushing.

13. The drill chuck according to claim 12, wherein the support sleeve is conical and has a cylindrical section at an end oriented toward the tool holder.

14. The drill chuck according to claim 1, wherein the securing bushing is made of metal, steel, stainless steel, or aluminum.

15. The drill chuck according to claim 1, wherein a number of teeth of the denticulation lies in a range from 100 to 140.

* * * * *